(No Model.)  3 Sheets—Sheet 1.
J. R. THOMAS.
PLANING AND GROOVING MACHINE.

No. 248,962. Patented Nov. 1, 1881.

WITNESSES
Wm Bayley
E. C. Parkson

INVENTOR
J. R. Thomas (No Model.)  3 Sheets—Sheet 2.

J. R. THOMAS.
PLANING AND GROOVING MACHINE.

No. 248,962.  Patented Nov. 1, 1881.

WITNESSES  INVENTOR
Wm Bayley  J R Thomas
E E Clarkson (No Model.)  3 Sheets—Sheet 3.
J. R. THOMAS.
PLANING AND GROOVING MACHINE.
No. 248,962. Patented Nov. 1, 1881.
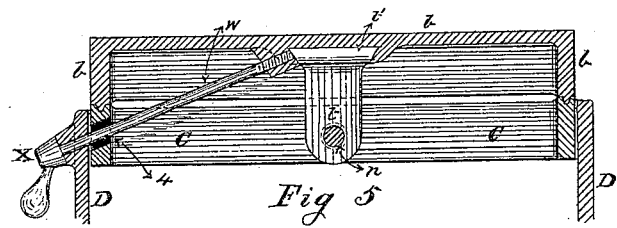
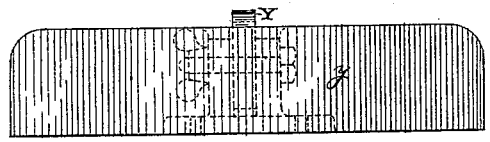
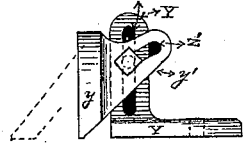
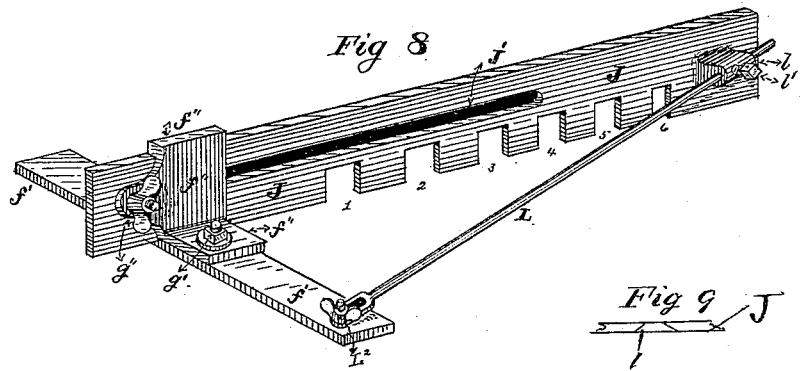
WITNESSES
Wm Bayley
E. C. Clarkson
INVENTOR
J. R. Thomas

UNITED STATES PATENT OFFICE.

JOHN R. THOMAS, OF SPRINGFIELD, ASSIGNOR TO CORDESMAN, EGAN & CO., OF CINCINNATI, OHIO.

PLANING AND GROOVING MACHINE.

SPECIFICATION forming part of Letters Patent No. 248,962, dated November 1, 1881.

Application filed February 1, 1881. (No model.)

*To all whom it may concern:*

Be it known that I, JOHN R. THOMAS, of the city of Springfield, county of Clarke, State of Ohio, have invented a new and useful Improvement in Planing and Grooving Machines, of which the following is a specification.

This invention relates to improvements in that class of wood-planing machines in which the tables are adjustable by means of hand-wheels and screws; and the object of the invention is to provide a novel construction of devices for adjusting the bearings of the cutter-head, for adjusting the tables simultaneously together or independently of each other, and to adjust the table more rapidly in a horizontal direction than in a vertical direction. These objects I accomplish by the mechanism illustrated in the accompanying drawings, in which—

Figure 1:
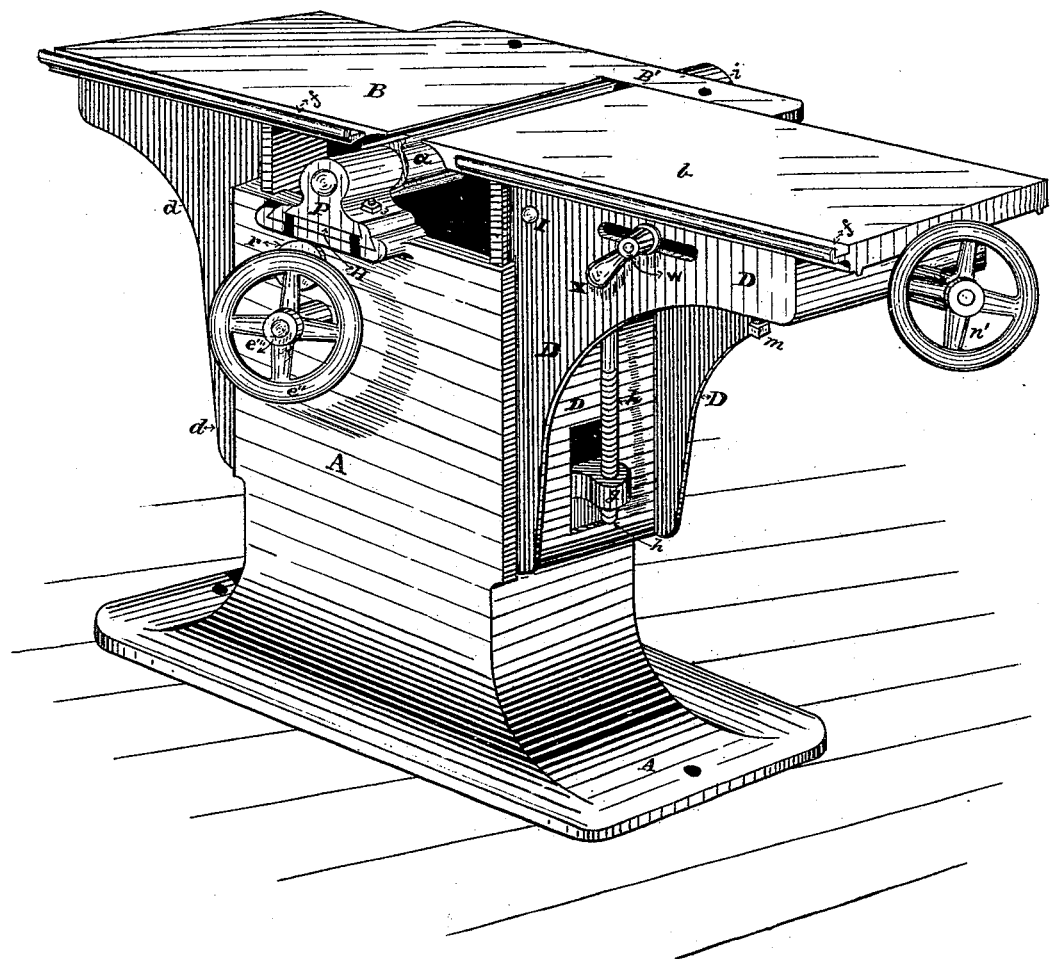
Figure 2:
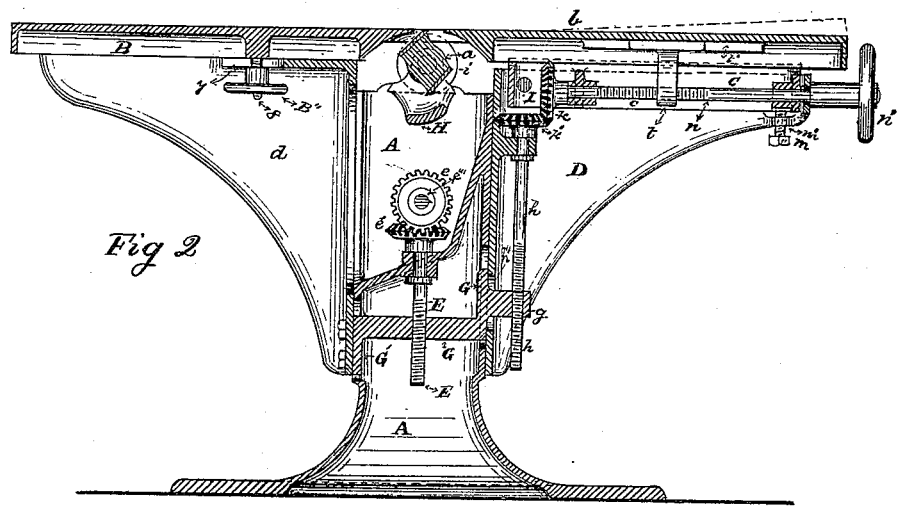
Figures 3, 4:
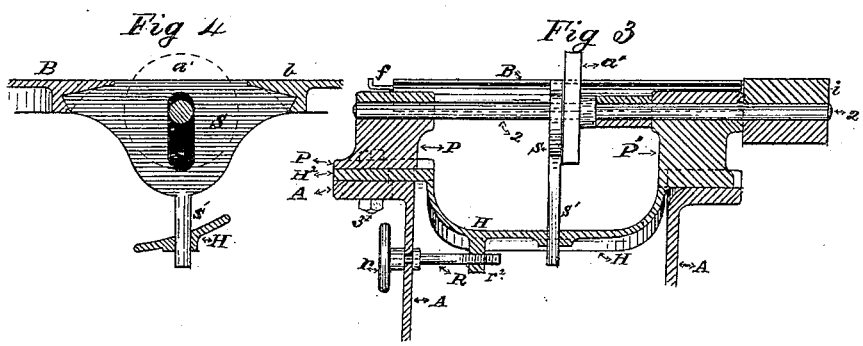

Figure 1 is a perspective view of my machine with the fence removed; Fig. 2, a longitudinal section through the tables; Fig. 3, a cross-section through the cutter-head, showing its bearings, their connecting-web, and means of adjustment, and a cross gaining or grooving cutter-head, and an end view of the bridge-iron; Fig. 4, a side view of the bridge-iron; Fig. 5, a cross-section through the table $b$, showing the arrangement of the loose nut and means to tighten the nut; Fig. 6, a front view of the fence; Fig. 7, an end view of the fence; Fig. 8, a perspective view of the gaining-fence; Fig. 9, a view of the bottom of the gaining-fence, showing the bevel of its openings.

Similar letters refer to similar parts in the several views.

A represents the frame of the machine, which may be of any shape preferred, having on its top suitable guideways for adjustable bearings, and on its sides slide-gibs for vertical adjustable brackets D and $d$, the required slots for the connecting-piece G, bearings for hand-wheel shaft $e'''$ and for bevel-gears $e$ and $e'$ and screw E.

$d$ is a vertical adjustable bracket, on top of which are grooved slideways, for guiding horizontal adjustable table B.

7, Fig. 2, shows a slot in the top web of bracket $d$, through which works the clamp-screw 8, used for clamping table B in the position needed.

D is a vertical adjustable bracket, on the top of which, and pivoted at I, is the longitudinal frame C, and on middle web of D is lug $k''$ for screw $h$, and through the same web is slot $h^2$ for lug $g$ of connecting-brace G. At the other end of bracket D is lug $m'$, threaded for the reception of adjusting set-screw $m$. On the top of swing-frame C are grooved slideways for table $b$, and at suitable positions are bearings for screw-shaft $n$. This swing-frame is adjusted by means of set-screw $m$, swinging in the arc of circle, as shown in dotted lines in Fig. 2, the object being to easily and readily get tables $b$ and B to form as perfect a plane as possible, and by moving the set-screw up or down it can be easily accomplished, the end of the swing-frame resting on the end of the screw and rising or lowering with the screw, and the table being set on the frame goes with it. On the under side of table $b$ is the sliding-way $t'$ for loose nut $t$, and on the bottom of the table are male slides (see Fig. 5) fitting into female slides on the top of swing-frame C, the table $b$ having a free horizontal movement on top of said frame. Table $b$ can be adjusted to or from the cutter-head by hand or by means of screw $n$, working through nut $t$ and operated by hand-wheel $n'$. When table $b$ is to be moved by hand, loosen hand-wrench $x$, which, acting on screw 4, will loosen nut $t$ and allow the table to be moved to the required position, and by tightening hand-wrench $x$ the nut is again clamped, when table $b$ is moved by means of screw $n$. Bracket D is also adjusted vertically at a slower rate of speed than table $b$ is adjusted longitudinally.

Brackets D and $d$, carrying tables B and $b$, are vertically adjustable together by means of hand-wheel $e''$, shaft $e'''$, gear-wheels $e$ and $e'$, and screw E, working through connecting-brace G. The connecting-brace G is firmly bolted to bracket $d$, as shown at G', Fig. 2, and has in the right place a threaded hole for the reception of adjusting-screw E, and at its other end a lug, $g$, and through said lug is also a threaded hole for screw $h$ of the independently-adjustable bracket D. It will be readily seen, in raising and lowering brackets $d$ and D, that the connecting-brace G, being bolted to bracket $d$ and held in position by screw E, while threaded lug $g$, by means of screw $h$, also firmly holds the bracket D, at the same time allows bracket D to have an independent vertical movement, if required.

Table $b$ has an independent vertical movement and horizontal movement from table B by means of the hand-wheel $n'$, screw $n$, nut $t$, gear-wheels $k$ and $k'$, screw $h$, and threaded lug $g$. It is required, in moving table $b$ and bracket D simultaneously, that table $b$ move horizontally one inch in the same time that bracket D moves vertically three-quarters of an inch, the reason for which is to prevent table $b$ from striking the cutter-head. I can accomplish this difference of movement in two ways in my machine, either by making screw $n$ with six threads to one inch, and using bevel-gearing $k$ and $k'$, and screw $h$ to have eight threads to one inch, or by making screws $n$ and $h$ with the same number of threads to the inch, this difference in the pitch of the screw $h$ making the difference of movement in the gear-wheels $k$ and $k'$.

P and P', Fig. 3, are bearings for cutter-head journal 2. H is a connecting-web for the bearings, having a hole for the reception of the shank S' of bridge-iron S, and lug $r^2$ for adjusting screw R. Bearing P' and web H are in one piece, or rigidly connected, and both ends of web H fit into slide-connections on top of frame A, and on the end H² of web H is a guide dovetail groove for bearing P, which is separately removable from web H and bearing P', for convenience in changing cutter-heads, and when bearing P is in place on the web the bearing and web are securely clamped to frame A by means of bolts 3, said bolts fitting into slots, (shown in Fig. 1,) and they are to be made just tight enough to hold the bearing and web firm, and to allow of the lateral movement of the web, bearings, and cutter-head together by means of hand-wheel $r$, screw R, and lug $r^2$.

When the machine is used for planing, a fence, Figs. 6 and 7, is generally required, and, in case it should be needed, it is bolted to extension B' of table B, Fig. 1, by bolts passing through holes in plate Y of fence and into threaded holes in the extension. $y$, Fig. 6, is the face of the fence, against which the wood is held. This plate $y$ can be set to any angle required, as shown in dotted lines, Fig. 7, by means of slot $z'$ in brackets on back of fence and slot $z$ in upright bracket on plate Y, and is held in the required position by clamp-bolt $y'$.

When the machine is used for cross grooving or gaining, the fence above described is not needed, but instead bridge-iron S, Figs. 3 and 4, and a gaining frame or fence, Fig. 8. In using this gaining-frame, part $f'$ of the frame is set into guide-groove $f$ on the outside edge of tables $b$ and B, the fence J extending across the table. In this fence are openings 1 2 3 4 5 6, as many as may be required. Those openings are of different widths, and each is a little wider than the thickness of the cutter-head working through it, and the openings are for the purpose of letting the cutter-head have free passage through them, and preventing it from splintering the back edge of the gain in its passage through the wood it is cutting. Those openings are made to fit the different sizes of cutters used, and are beveled on the back, as shown in Fig. 9, so that if the fence is set to an angle the cutter-head will have free passage. Fence J has lateral adjustment by means of slot J' and clamp-bolt $g''$, the fence working through a guide on the face of the vertical swivel-piece $f''$. In adjusting fence J, clamp-bolt L² of rod L should also be loosened, and when the fence is in the required position tighten the clamp-bolts and it is firmly held. The swivel-piece $f''$ is bolted to guide $f$ by bolt $g'$. The reason for using but one bolt is to allow fence J and swivel-piece $f''$ to be set to an angle for angular gaining, which is accomplished by loosening clamp-bolt L² on sliding piece $f'$, and by means of rod L pulling the fence to the required angle, and by again tightening clamp-bolt L² the fence is firmly held.

I do not here claim the construction of gaining-fence shown and described, as such will form the subject-matter of a separate application for Letters Patent.

I am aware that prior to my invention axially-removable bearings have been used. Therefore I do not claim, broadly, the removable bearing; but What I do claim, and wish to secure by Letters Patent, is—

1. The combination of vertically-adjustable bracket D, pivoted frame C, adjusting set-screw $m$, and horizontally-adjusting table $b$, as herein set forth.

2. The combination, with the adjustable tables and the supporting-frame, of the two bearings P P' for the cutter-head journal, connected by a web, H, and the adjusting-screw for adjusting said bearings engaging the said web, one of these bearings being rigid with the web and the other being detachably connected therewith, substantially as described.

3. The combination of the vertically and horizontally movable table $b$ with the vertically-adjustable bracket D, and the vertical and horizontal adjusting-screws $h$ $n$, provided with intermeshing gear-wheels, the thread of one screw being at a different pitch from the thread of the other screw, and the screws being arranged to move the table horizontally and vertically at the same time, and more rapidly in the former than the latter direction, substantially as and for the purpose described.

4. The combination, with the table $b$, having on its under side a way connected with the table, but capable of sliding thereon, and provided with a depending nut, $t$, of a vertically-swinging frame, C, adjustable at one end, and a horizontal screw, n, passing through the depending nut t and journaled in bearings on the swinging frame, substantially as described.

5. The table b, having on its under side a way connected with the table, but capable of sliding thereon, and provided with a depending nut, t, and the swinging frame C, adjustable at one end, and carrying a horizontal screw, n, passing through the nut t, in combination with the vertical screw h, connected by bevel-gear wheels with the horizontal screw, the vertically-adjustable connecting-piece G, attached to the bracket d, and the table B, adjustably connected with the said bracket, substantially as described.

6. The fence Y, constructed with the stationary upright having the vertical slot z, in combination with the face-plate having the rearward-extending inclined slot z' and the clamping-bolt y', substantially as described.

In testimony whereof I have hereunto set my hand on this the 23d day of December, 1880.

JOHN R. THOMAS.

Witnesses:
  E. C. CLARKSON,
  WM. BAYLEY.